US010712159B2

(12) United States Patent
Grabowski et al.

(10) Patent No.: US 10,712,159 B2
(45) Date of Patent: Jul. 14, 2020

(54) CRITICAL SYSTEM OPERATIONS AND SIMULATIONS USING WEARABLE IMMERSIVE AUGMENTED REALITY TECHNOLOGY

(71) Applicants: Martha Grabowski, Cazenovia, NY (US); Jean-Philippe Rancy, Queens Village, NY (US)

(72) Inventors: Martha Grabowski, Cazenovia, NY (US); Jean-Philippe Rancy, Queens Village, NY (US)

( * ) Notice: Subject to any disclaimer, the term of this patent is extended or adjusted under 35 U.S.C. 154(b) by 298 days.

(21) Appl. No.: 15/949,598

(22) Filed: Apr. 10, 2018

(65) Prior Publication Data

US 2018/0292213 A1    Oct. 11, 2018

Related U.S. Application Data

(60) Provisional application No. 62/483,752, filed on Apr. 10, 2017.

(51) Int. Cl.
| | | |
|---|---|---|
| *G01C 21/20* | (2006.01) | |
| *G02B 27/01* | (2006.01) | |
| *G01S 19/14* | (2010.01) | |
| *G05D 1/02* | (2020.01) | |
| *G06T 19/00* | (2011.01) | |
| *G01S 19/13* | (2010.01) | |
| *G05D 1/00* | (2006.01) | |

(52) U.S. Cl.
CPC ........... *G01C 21/20* (2013.01); *G01C 21/203* (2013.01); *G01S 19/13* (2013.01); *G01S 19/14* (2013.01); *G02B 27/017* (2013.01); *G05D 1/0016* (2013.01); *G05D 1/0206* (2013.01); *G06T 19/006* (2013.01); *G02B 2027/0178* (2013.01)

(58) Field of Classification Search
CPC ....... G01C 21/20; G01C 21/203; G01S 19/13; G05D 1/0016; G05D 1/0206; G02B 27/017; G02B 2027/014; G02B 2027/0178
See application file for complete search history.

(56) References Cited

U.S. PATENT DOCUMENTS

| | | | |
|---|---|---|---|
| 6,181,302 B1 * | 1/2001 | Lynde | G02B 23/18 345/7 |
| 8,301,319 B2 * | 10/2012 | Lapidot | G01C 23/00 340/951 |
| 9,429,442 B2 | 8/2016 | Kamada et al. | |
| 9,544,491 B2 * | 1/2017 | Pryszo | H04N 5/23296 |

(Continued)

OTHER PUBLICATIONS

Grabowski, Martha; "Research on Wearable, Immersive Augmented Reality (WIAR) Adoption in Maritime Navigation"; The Journal of Navigation; 2015; 68; pp. 453-464; Copyright—The Royal Institute of Navigation 2015.

*Primary Examiner* — Thomas Ingram
(74) *Attorney, Agent, or Firm* — Hoffman Warnick LLC

(57) ABSTRACT

A system, method and program product for utilizing WIAR technology to aid in the navigation of a marine vessel. A system is provided that includes a WIAR device for displaying marine navigation data and receiving command inputs; a middleware component that interfaces with the WIAR device and a navigation system of a marine vessel; and a display coordinator that determines a set of display items to display on the WIAR device, wherein the set of display items are determined in response to an operational mode of the marine vessel.

17 Claims, 7 Drawing Sheets

(56) References Cited

U.S. PATENT DOCUMENTS

| | | | | |
|---|---|---|---|---|
| 9,826,164 | B2* | 11/2017 | Pryszo | H04N 5/23293 |
| 2007/0030211 | A1* | 2/2007 | McGlone | B63B 43/00 |
| | | | | 345/7 |
| 2010/0302233 | A1* | 12/2010 | Holland | B63C 11/12 |
| | | | | 345/419 |
| 2012/0158287 | A1* | 6/2012 | Altamura | G01C 21/20 |
| | | | | 701/412 |
| 2013/0271301 | A1* | 10/2013 | Kabel | B63B 49/00 |
| | | | | 340/987 |
| 2014/0063064 | A1* | 3/2014 | Seo | G08G 1/0962 |
| | | | | 345/633 |
| 2014/0240313 | A1* | 8/2014 | Varga | G06T 19/006 |
| | | | | 345/419 |
| 2015/0130685 | A1 | 5/2015 | Kim et al. | |
| 2015/0237193 | A1* | 8/2015 | Zeilingold | H04W 4/50 |
| | | | | 455/418 |
| 2016/0131913 | A1 | 5/2016 | Kim et al. | |
| 2016/0203648 | A1* | 7/2016 | Bilbrey | G06F 1/1694 |
| | | | | 348/333.02 |

\* cited by examiner

CRITICAL SYSTEM OPERATIONS AND SIMULATIONS USING WEARABLE IMMERSIVE AUGMENTED REALITY TECHNOLOGY

PRIORITY

This application claims priority to U.S. Provisional Application 62/483,752, filed on Apr. 10, 2017, the contents of which are hereby incorporated by reference.

TECHNICAL FIELD

The subject matter of this invention relates to operational safety/mission critical systems, and more particularly to a system and method of integrating a wearable immersive augment reality (WIAR) technology in such systems.

BACKGROUND

Critical system operations, including those involving mission critical and operational safety systems, require experienced personnel to make timely and critical decisions in response to various types of incoming data. Examples include the operation of transportation systems, energy generation systems, and other complex machines. In such settings, bad decision making by such personnel can result in disastrous consequences, including the loss of property and life.

For example, navigating large marine vessels presents various challenges for the pilot and crew. In particular, when navigating tight areas such as harbors, the pilot must continuously monitor on-board displays for relevant readings while at the same time physically watch the surroundings.

SUMMARY

Aspects of the disclosure provide a system, method and program product for utilizing WIAR technology to aid in the operation and simulation of critical systems.

A first aspect of the invention provides a WIAR (wearable immersive augmented reality) based navigation system, comprising: a WIAR device for displaying marine navigation data and receiving command inputs; a middleware component that interfaces with the WIAR device and a navigation system of a marine vessel; and a display coordinator that determines a set of display items to display on the WIAR device, wherein the set of display items are determined in response to an operational mode of the marine vessel.

A second aspect provides a computer program product stored on a non-transitory computer readable storage medium, which when executed by a processor, provides a WIAR (wearable immersive augmented reality) based navigation system, comprising: program code that interfaces with a WIAR device and a navigation system of a marine vessel; program code for outputting marine navigation data to a WIAR device and for receiving command inputs from the WIAR device; and program code that determines a set of display items to display on the WIAR device, wherein the set of display items are determined in response to an operational mode of the marine vessel.

A third aspect provides method of implementing a WIAR (wearable immersive augmented reality) based navigation system, comprising: establishing connectivity between a WIAR device and a navigation system of a marine vessel; reading in strings of NMEA data from the navigation system; deciphering the strings of NMEA data into navigational display items; determining a subset of navigational display items to display on the WIAR device, wherein the subset of navigational display items are determined in response to an operational mode of the marine vessel; outputting the subset of navigational display items to the WIAR device; and changing the operational mode and displaying a new subset of navigational display items.

BRIEF DESCRIPTION OF THE DRAWINGS

These and other features of this invention will be more readily understood from the following detailed description of the various aspects of the invention taken in conjunction with the accompanying drawings in which.

Figure 1:
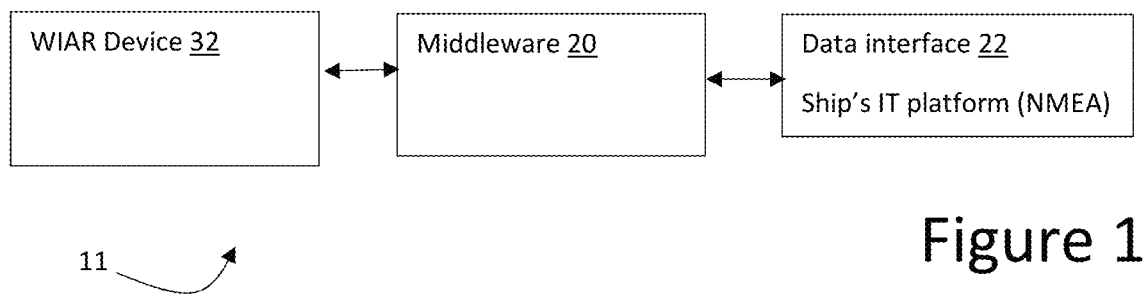
FIG. 1 shows a system diagram of a WIAR based navigation system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring to the drawings, FIG. 1 depicts a flow of an illustrative embodiment of a WIAR based navigation system 11 that utilizes a wearable immersive augment reality (WIAR) device 32, such as Google Glasses® or the like (hereafter "WIAR glasses"). In this case, the WIAR device 32 interfaces with middleware 20 that links to a data interface 22 that communicates directly with the ship's information technology IT platform (i.e., navigation systems). The IT platform may for example be implemented using NMEA standards and protocols.

Figure 2:
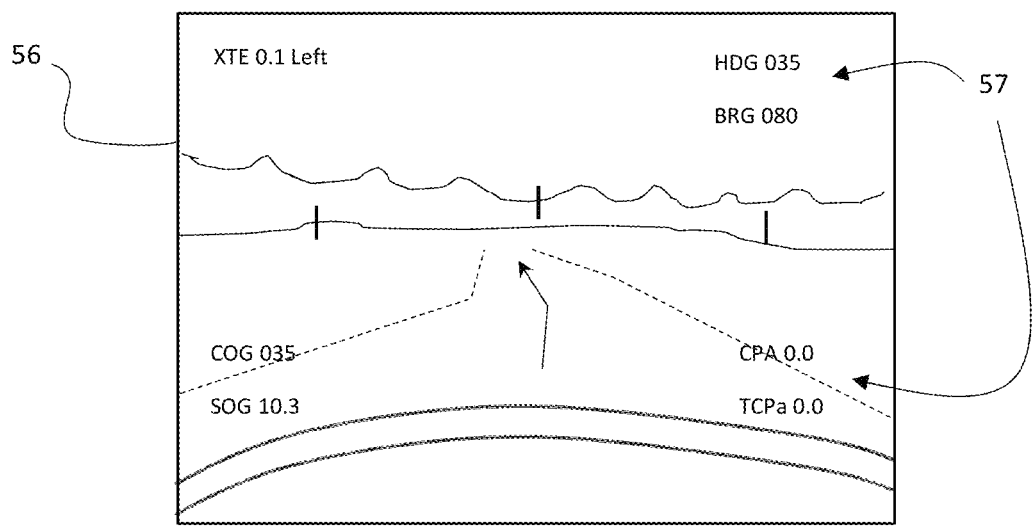
FIG. 2 shows an illustrative view utilizes WIAR glasses according to embodiments.

FIG. 2 depicts an illustrative view 56 through WIAR glasses. As depicted, the pilot can view navigation information 57 and interact with/control the ship via the WIAR glasses. An example view from the bridge of a vessel is shown in which the user is able to physically view the sea through WIAR glasses, which additionally provides augmented navigation information 57 to the user. In this example, the user sees the real world through the WIAR glasses as well as navigational readings in the corners of the view field and headings (dotted lines and arrows) overlaying the viewable sea.

Note that while this illustrative embodiment utilizes WIAR glasses, it is understood that any WIAR technology or combination of technologies may be utilized (e.g., smart clothing, smart watch, goggles, shields, helmets, smart window, etc.). Generally, the WIAR device 50 may be configured to include a memory chip and processor, a power source, a speaker, microphone(s), a video camera, a Wi-Fi system, GPS, Bluetooth capability, an accelerometer, a gyroscope, a compass, etc. The WIAR device 50 may be implemented to understand inputs including voice commands and gestures such as taps, swipes, blinking, etc. Outputs may include visual, audio, or tactile outputs. For example, WIAR glasses may display information on a small screen located above the user's eye.

Illustrative information that can be displayed/outputted includes navigation data, compass readings, auxiliary ship functions, weather information, ship ECDIS (electronic chart display & information system) monitors, ship ARPA (automated radar plotting aid) monitors, AIS (automated identification system) output, depth, position, navigation sensor systems, radar, sonar, etc. Illustrative commands that can be inputted include, e.g., heading changes, speed changes, display settings, etc.

Figure 3:
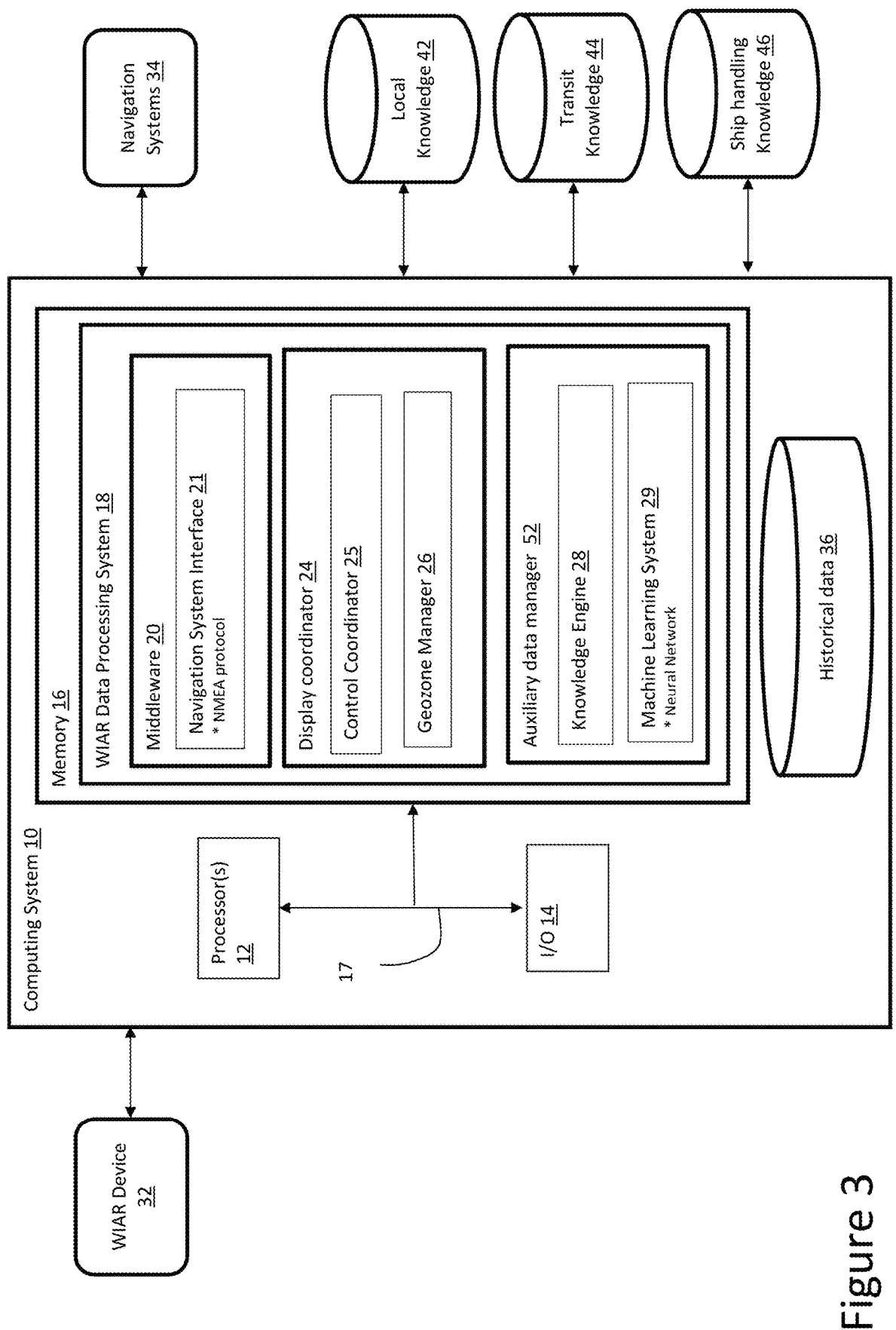
FIG. 3 shows a computing system having a WIAR data processing system according to embodiments.

FIG. 3 depicts a computing system 10 having a WIAR data processing system 18 that include middleware 20 to broker communications between the WIAR device 32 and on-board navigation systems 34. Middleware 20 utilizes a navigation system interface 21 for interfacing with the navigation systems 34. Middleware 20 also may for example utilize API's provided by the WIAR device 32 to send and receive data and instructions. Navigation system interface 22 may for example utilize recognized protocols or standards for communicating with the navigation systems 34, such as NMEA. NMEA is a combined electrical and data specification for communication between marine electronics such as echo sounder, sonars, anemometer, gyrocompass, autopilot, GPS receivers and many other types of instruments. It has been defined by, and is controlled by, the National Marine Electronics Association. The electrical standard that is used is, e.g., EIA-422, although most hardware with NMEA-0183 outputs are also able to drive a single EIA-232 port. Although the standard calls for isolated inputs and outputs, there are various series of hardware that do not adhere to this requirement.

The NMEA 0183 standard uses a simple ASCII, serial communications protocol that defines how data are transmitted in a "sentence" from one "talker" to multiple "listeners" at a time. Through the use of intermediate expanders, a talker can have a unidirectional conversation with a nearly unlimited number of listeners, and using multiplexers, multiple sensors can talk to a single computer port. At the application layer, the standard also defines the contents of each sentence (message) type, so that all listeners can parse messages accurately. Note that while embodiments of the present invention are implemented using NMEA strings, it is understood that any standard or non-standard electrical, electronic or radio signal interface could be utilized.

WIAR data processing system 18 also includes a display coordinator 24 for managing the navigation system information being outputted and displayed to the WIAR device 32. A control coordinator 25 may be utilized to manage and control commands from the WIAR device 32, e.g., to control the operation of the WIAR device 32 or for inputs to the navigation systems 34.

Display coordinator 24 and/or control coordinator 25 may further be controlled by a geozone manager 26. Geozone manager 26 utilizes defined geozones to dictate the information to be displayed to, and/or the commands that can be entered by the user. Thus, as a ship travels from port to sea to port, different types of information can be displayed based on location. For instance, when docking, a more robust set of information may be displayed than when at sea. Geozone manager 26 may configure zones for any purpose, e.g., environmental conservation zones where speed or noise might be an issue, search and rescue zones where coordinated efforts are required, buoy tendering in which seasonal buoys are placed and removed, docking, etc. In each zone, an optimized set of information is displayed for the user.

Further, depending on the role and level of skill of the crew, including how much training they received with the WIAR device 32, different types of display information or control capabilities may be provided to different users. For example, a pilot who is relatively new with the WIAR device 32 may not be given gesture based control capabilities for maneuvering the ship.

In addition to navigation information, an auxiliary data manager 52 may be employed to provide auxiliary data (e.g., recommendations, alerts, knowledge display items, etc.) for display on the WIAR device 32. For example, the flow of information between the WIAR device 32 and navigation systems 34 may be further augmented and controlled by a knowledge engine 28 capable of outputting knowledge display items. In general, data associated with three types of knowledge used in ship navigation and piloting may be accessed, processed and displayed: local knowledge 42, transit-specific knowledge 44, and ship handling knowledge 46.

Local knowledge 42 provides the port and harbor context that permits the bridge watch team to maintain the ship's orientation in, e.g., the harbor, to accurately fix the vessel's position and track, and to understand and anticipate the dynamic characteristics of the environment. Transit knowledge 44 is acquired before and during a particular transit. It includes processing data on the environment (wind, weather, current, tide and drift), the harbor, the ship (its ability to respond to orders, its communication, propulsion and navigation suite, its steering system) and their interactions under the conditions of a specific transit. Ship handling knowledge 46 is acquired primarily through observing and practice during bridge officer training and pilot apprenticeship programs. Knowledge engine 28 provides an automated mechanism for accessing data and using local, transit-specific and shiphandling knowledge to gain the information needed to perform the three tasks of piloting: track-keeping; maneuvering and collision avoidance; and adherence to procedures and good practice developed over years of shiphandling, referred to as the 'practice of good seamanship' (International Maritime Organization, 1989).

Local knowledge 42 (e.g., features of the local harbor, currents, etc.), transit knowledge 44 (e.g., features of the ship, type of cargo, conditions, etc.) and ship handling knowledge 46 (skill level and experience of the crew, etc.) may for example be stored and accessed locally or remotely via a network, cloud, etc., by piloting engine 28 to enhance and/or control the information being inputted and/or outputted with the WIAR technology 32. For example, piloting engine 28 may utilized machine learning to analyze structured or unstructured data (ship logs, publications, prior docking data, simulations, weather, time, etc.) that might be useful for the pilot. For instance, records may indicate that the particular harbor is subject to unusually strong currents during this time of the year. Further, it may be reported that a similar type of heavily loaded ship had trouble maintaining their heading in the harbor. Still further, social media may report that a sailing regatta is scheduled that day near the coast. Such information could be extracted and relayed, e.g., as a warning, to the pilot via the WIAR technology 32.

Auxiliary data manager may also include a machine learning system 29 that for example uses machine learning to calculate and display messaging based on prior experiences (i.e., historical data 36) that is relevant to a current situation. For example, data associated with prior dockings in a given port may be stored as historical data 36. Machine learning system 29 can evaluate prior experiences and, e.g., use predictive reasoning to make recommendations to the user. For example, a neural network, trained on prior historical data 36, could evaluate current location, headings, speed, weather, etc., and output a predictive result and recommendation (e.g., "based on current conditions, analysis shows a likely overshoot to the stern, consider taking corrective action such as reducing speed by 2 knots").

Historical data 36 may for example include information obtained from WIAR data processing system 18, e.g., captured video, data logs, performance data of the pilot, etc. It may also include shared data obtained from other users on other ships, from training simulations, or from any other source. Once collected and stored, historical data 36 can also be reviewed later on to evaluate and critique the performance of the crew and pilot.

Figure 4:
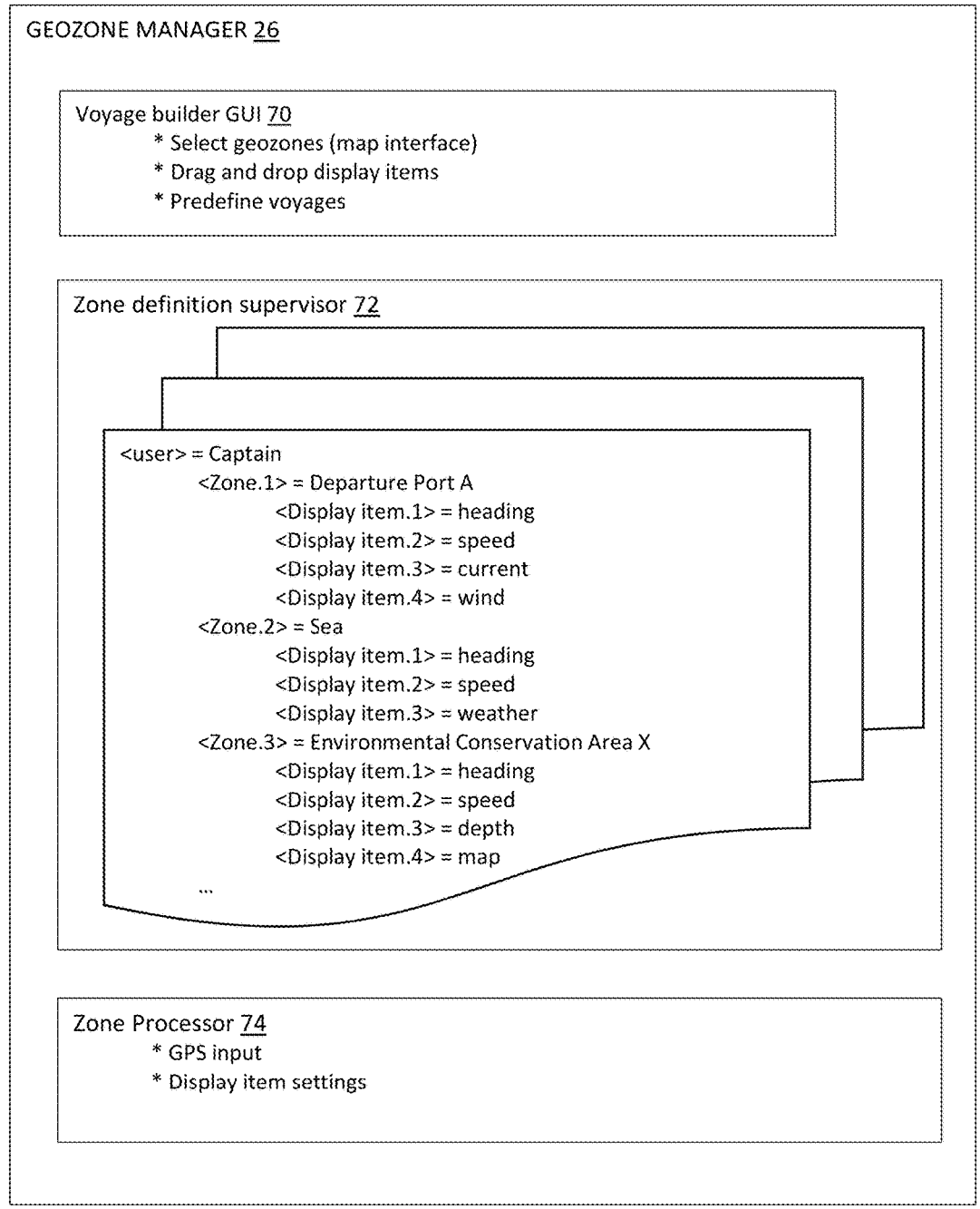
FIG. 4 depicts a geozone manager according to embodiments.

It is understood that the type and amount of information and control analyzed and provided to the pilot and/or crew via WIAR device 32 can vary depending on the operational mode. Ideally, the number and type of display items should be optimized to eliminate visual clutter while providing the most beneficial information. In one approach, geozone manager 26 may be utilized to control the operational mode based on a detected location/geozone of the ship. FIG. 4 depicts an example implementation of a geozone manager 26 that generally includes a voyage builder GUI 70, a zone definition supervisor 72, and a zone processor 70. Voyage builder GUI 70 provides an administrative interface for selecting geozones (e.g., departure port, open sea/steaming area, high traffic lane, arrival port, etc.) that will be traversed during a voyage, and for selecting the display items that will be displayed while the ship is in each zone. The GUI 70 may use default mode settings for zone types, e.g., departure port geozones could default to display a first predetermined set of display items, while open sea geozones could default to a second set of display items. Alternatively, the GUI 70 may allow for an administrator to customize the specific display items in each selected geozone. Further, the administrator could simply select a predefined voyage, with a sequence of predefined geozones and associated display items. Additionally, the types of information displayed may be further refined by the end user, e.g., the captain may receive a first set of display items while a co-pilot may receive a second.

In this example, a zone definition supervisor 72 stores the geozone settings for a planned voyage. In this case, the "captain" user is configured to receive a first set of information while leaving port A, a second set of information while at open sea, etc.

Zone processor 74 utilizes a current GPS position to determine and set display items for output. For example, if the GPS indicates that the ship is Zone.3, then appropriate display items are outputted to each defined user.

Figure 5:
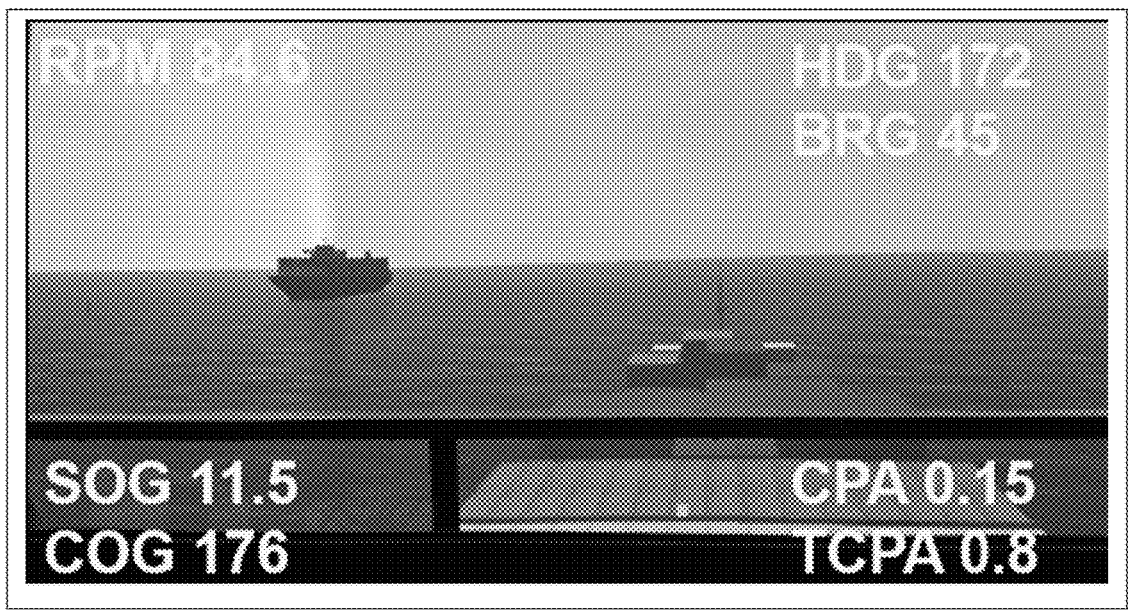
FIG. 5 depicts a steam mode view according to embodiments.
Figure 6:
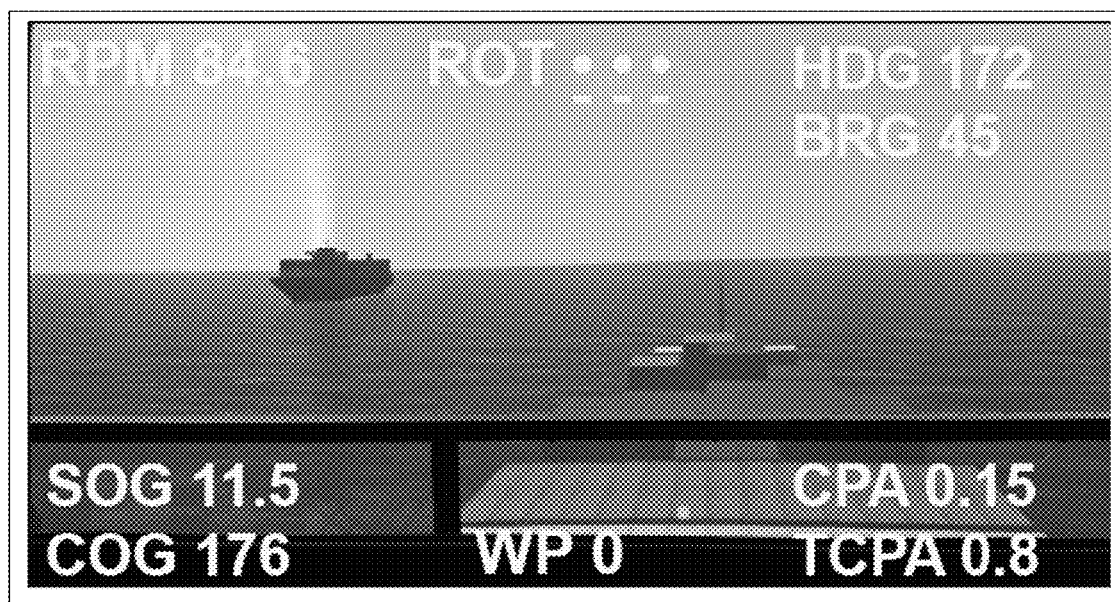
FIG. 6 depicts a docking mode view according to embodiments.

FIGS. 5 and 6 show two different WIAR views involving steam and docking geozones, respectively. In this example, the full set of navigational display items that can be displayed include:
1. RPM: The revolutions the ship engine is performing measured per minute.
2. COG: The actual path of a vessel with respect to the seabed, measured in degrees.
3. SOG: The actual speed of a vessel with respect to the seabed.
4. HDG: The direction in which a vessel is pointed at any given moment,
5. BRG: The direction of an object from an observer, measured in degrees.
6. CPA/TCPA: Closest point of approach (CPA) and Time to the Closest Point of Approach (TCPA), both of which provide information about the acquired target ship's projected navigational path and its risk of collision to the operator's own ship.
7. ROT: The rate a ship is turning in degrees nute.
8. WP (waypoint): is an intermediate point or place on a route or line of travel.

Depending on the operational mode, a subset of the display items can be outputted. As depicted, docking mode (FIG. 6) displays ROT and WP information, in addition to the other display items shown in FIG. 5. In addition to using geozones to change from one mode to another, a gesture, swipe, hardware button/tap, voice control, etc., could likewise be used to manually change modes. As shown in FIGS. 5 and 6, users see the external physical setting with display items that may include targets, navigational aids, shore and channel markings in context, using traditional navigational and ship piloting cues during the ship transit. ARPA and ECDIS icons and electronic charts can be superimposed on the displays as layers in the user interface; more useful, however, course, speed, wind and current speed and direction and under keel clearance information can be displayed in real time with information from the physical environment so that electronic navigation display and decision-making information can be appreciated in context, without the need to turn away from the developing navigational situation or look down at a display. As the user travels from bridge wing to bridge wing, the integrated navigational display items, chosen automatically or by the user, travels with the user and is visible to the user in context, in real time, and in relation to the other users and the navigational transit.

As noted, WIAR Data Processing System 18 (FIG. 3) interfaces with a ship's navigational systems 34 such as the radar, automatic radar plotting aid (ARPA), electronic chart display and information system (ECDIS), Automatic Identification System (AIS) and other navigational systems and sensors through a middleware component 20. The middleware 20 runs on any operating system, e.g., UNIX, Windows, iOS, Android etc., and includes an interpreter operating system running a local instance of PHP to host the local application formatting; an Apache/http server that hosts the local network application site; a terminal communication capture program called Realterm; and Microsoft Excel with a VBA enclosure for the deciphering engine. This middleware 20 wraps the communication and data formatting for the WIAR device 32 to read and display derived values correctly.

WIAR Data Processing System 18 may run in an x32bit Android architecture, on the top level of the Android operating stack. It may be deployed using the Android Software Development Toolkit (SDK), which utilizes Java and multiple coding libraries, and the Google Glass Developer Kit (GDK) development platforms. The Android SDK also supports cross-platform systems, facilitating communication between different systems and technologies.

Middleware 20 connects the ship's navigational bridge systems and WIAR device 32, relying on standard interfaces for portable pilot units (PPUs), which are required for all ships. Through this standard interface, data is transferred from the ship's bridge equipment to the PPU in National Maritime Electronic Association (NMEA) format. The NMEA formatted string contains live data from shipboard sensors or data from the ECDIS, ARPA, AIS or radar. The NMEA strings that are sent from the bridge to the PPU are then interpreted by PPU by a deciphering mechanism and reformatted. Communication between the PPU and the ship's bridge system may be a static direct connection that represents a one to many relationships: the bridge navigation systems 34 can send one or many strings to a portable pilot unit; the portable pilot unit can only receive strings from one bridge equipment at a time. The connection between the PPU and the bridge navigation system mimics serial ports that send data at a variable baud rate.

The middleware 20 receives data from the interpreter, converts the raw NMEA formatted string to a numerical value, and pushes that data to the WIAR device 32. A deciphering interpreter merges the two systems, reading data from the bridge navigation system and sending that data over to the WIAR platform in the correct format. The WIAR device 32 calls the saved file in the network repository generated by the deciphering interface every second. The middleware takes raw data from the ship navigation systems, sorts and reformats the data to a technological standard (ASCII) and stores it in a network repository to be read by the WIAR device 32.

Figure 7:
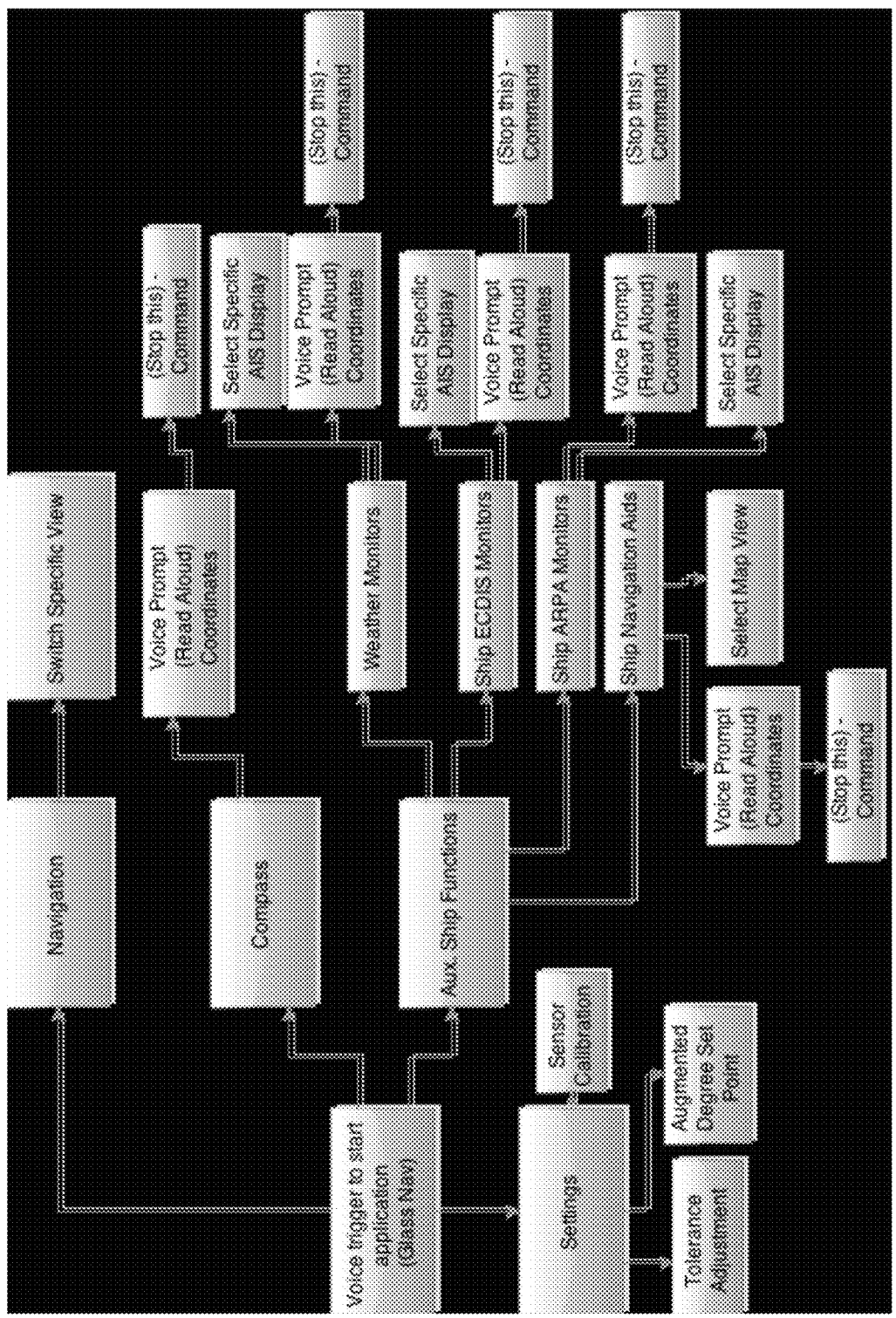
FIG. 7 depicts process flow diagram according to embodiments.

One illustrative logical information flow of the WIAR Data Processing System 18 is illustrated in FIG. 7. A voice or touch activates the application, which triggers calls to the navigation, compass and auxiliary ship functions, as well as to the Settings module in order to adjust tolerances due to weather, humidity, temperature, orientation, degree set points and to calibrate linked sensors. Using inputs from the navigation and compass functions, the auxiliary ship functions polls information from the shipboard ARPA, ECDIS, navigation systems and from the selected chart view. Voice and touch prompts then sequence the user through a series of initialization steps.

Once the application has been initialized, the user can choose from several starting points: Navigation, Compass, Auxiliary Ship Functions, and Settings. Within the Auxiliary Ship Functions, users can access specific weather or environmental sensors or monitors, the ship's ECDIS and/or ARPA monitors, or specific ship navigation systems or displays. The user may also choose to have preset display items (course, speed ETAs, etc.) displayed so that they appear superimposed on the view of the navigational situation.

Figure 8:
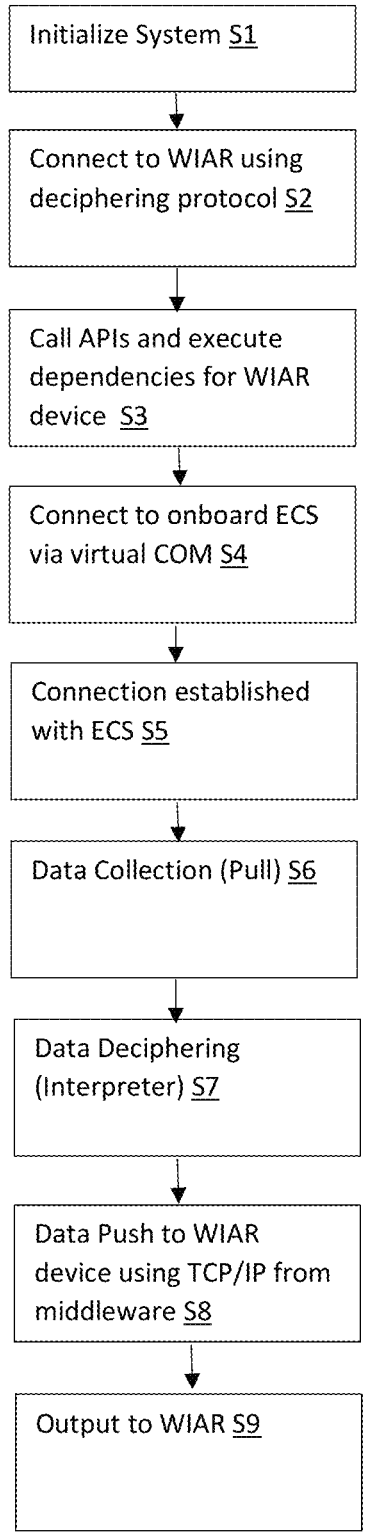
FIG. 8 depicts a middleware flow diagram according to embodiments.

FIG. 8 depicts the middleware flow. At 51, the system is initialized, and at S2, a connection is established between the WIAR device 32 and navigation systems 34 using a deciphering protocol. The deciphering protocol is configured to receive strings of navigation information and COM data from the bridge navigation systems via a TCP/IP local address and virtual COM port, respectively. The collected information is inputted into a COM port on a local server and reformatted into display items (e.g., COG, SOG, CPA, WP, etc.). Graphical information, such as a "dot representations" of ROT may be generated by the deciphering protocol as well. At S3, specific APIs are called and dependencies are executed for the WAIR device 32.

At S4 and S5, the middleware 20 tries to connect to the onboard ECS via a virtual COM and establishes a connection. At S6, data is pulled from the ECS and is deciphered at S7. At S8, data is pushed to the WIAR device 32, e.g., using TCP/IP from the middleware and is output on the WIAR device at S9.

Figure 9:
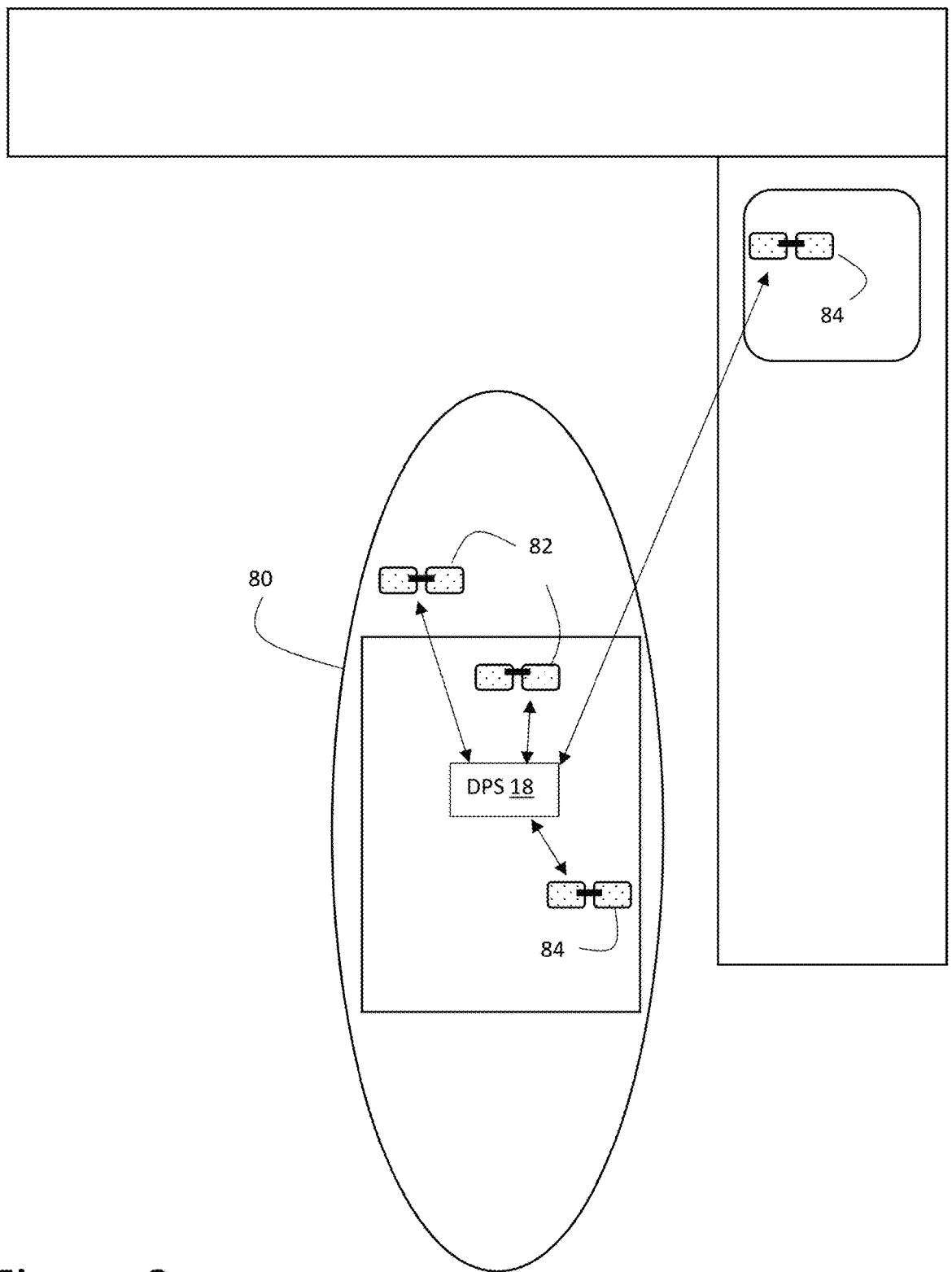
FIG. 9 shows a multiuser scenario according to embodiments.

WIAR data processing system 18 may be implemented as a multiuser system in which multiple users are equipped with WIAR glasses (or the like) that share the same information. Consider the example vessel 80 shown in FIG. 9. A bridge watch team comprising a ship's captain and mate on watch could each be equipped with a pair of WIAR glasses 82. The pilot, also outfitted with WIAR glasses 84, boards the vessel and the WIAR data processing system 18 associated with each automatically synch over Bluetooth as the pilot enters the bridge. No laptop or pilot carry aboard set up time is required, and the items required for various pilot-master communication exchanges could be visible on both the pilot's and the master's WIAR glasses. Shoreside traffic management personnel could also share the displays, images, data and dashboards available through WIAR glasses 86, thus facilitating the development of shared mental models on the bridge and with shore-based operators, and providing the needed and often-mentioned navigational context to shoreside E-navigation participants.

Course, speed, target, CPA and TCPA information, available from the ARPA and ECDIS electronic navigation systems on board, provide common input to the shared displays; navigational, environmental, wind, weather and advisory input are also provided and synchronized across the applications. As a result, all members of the bridge watch share the same information in synchrony and in context with the external view of the navigational transit. The synchronization and shared mental models of the navigational transit could alleviate traditional bridge resource management challenges with differing mental models of the transit held by different members of the bridge watch team.

It is understood that WIAR data processing system 18 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Possible implementation technologies may include 3G/4G/5G WLANs, virtual networks, virtual machines, cloud-based architectures, bubble and optical memory, and containers/containerization schemes. Additionally, the WIAR capability could be provided, e.g., in a software as a service (SaaS) or platform as a service (PaaS) configuration, and thus be distributed independent of a hardware configuration.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 that may comprise any type of computing device and for example includes at least one processor 12, memory 16, an input/output (I/O) 14 (e.g., one or more I/O interfaces and/or devices), and a communications pathway 17. In general, processor(s) 12 execute program code which is at least partially fixed in memory 16. While executing program code, processor(s) 12 can process data, which can result in reading and/or writing transformed data from/to memory and/or I/O 14 for further processing. The pathway 17 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the WIAR data processing system 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A WIAR (wearable immersive augmented reality) based navigation system, comprising:
   a WIAR device for displaying marine navigation data and receiving command inputs;
   a middleware component that interfaces with the WIAR device and a navigation system of a marine vessel;
   a display coordinator that determines a set of display items to display on the WIAR device, wherein the set of display items are determined in response to an operational mode of the marine vessel; and
   a knowledge engine for:
   analyzing one of local knowledge, transit knowledge or ship handling knowledge; and
   displaying an associated knowledge display item.

2. The navigation system of claim 1, wherein the operational mode is determined based on:
   a set of predefined geozones; and
   a current GPS location.

3. The navigation system of claim 1, wherein the WIAR device comprises WIAR glasses.

4. The navigation system of claim 1, wherein the middleware component periodically reads in strings of NMEA data and reformats the strings as a set of navigational display items.

5. The navigation system of claim 4, wherein the navigational display items include:
   RPM (revolutions per minute), COG (vessel path), SOG (speed), HDG (direction), BRG (direction of an object), CPA/TCPA (closest point of approach/time to the CPA), ROT (rate of turning) and WP (waypoint).

6. The navigation system of claim 1, wherein the display items include a recommended action from a machine learning system.

7. The navigation system of claim 1, further comprising a set of WIAR devices, wherein each of the set of WIAR devices displays a common set of information.

8. A computer program product stored on a non-transitory computer readable storage medium, which when executed by a processor, provides a WIAR (wearable immersive augmented reality) based navigation system, comprising:
   program code that interfaces with a WIAR device and a navigation system of a marine vessel;
   program code for outputting marine navigation data to a WIAR device and for receiving command inputs from the WIAR device;
   program code that determines a set of display items to display on the WIAR device, wherein the set of display items are determined in response to an operational mode of the marine vessel; and
   program code for:
   analyzing one of local knowledge, transit knowledge or ship handling knowledge; and
   displaying an associated knowledge display item.

9. The program product of claim 8, wherein the operational mode is determined based on:
   a set of predefined geozones; and
   a current GPS location.

10. The program product of claim 8, wherein the middleware component periodically reads in strings of NMEA data and reformats the strings as a set of navigational display items that include: RPM (revolutions per minute), COG (vessel path), SOG (speed), HDG (direction), BRG (direction of an object), CPA/TCPA (closest point of approach/time to the CPA), ROT (rate of turning) and WP (waypoint).

11. The program product of claim 8, wherein the display items include a recommended action from a machine learning system.

12. The program product of claim 8, further comprising outputting display items to a set of WIAR devices, wherein each of the set of WIAR devices displays a common set of information.

13. A method of implementing a WIAR (wearable immersive augmented reality) based navigation system, comprising:
   establishing connectivity between a WIAR device and a navigation system of a marine vessel;
   reading in strings of NMEA data from the navigation system;
   deciphering the strings of NMEA data into navigational display items;
   determining a subset of navigational display items to display on the WIAR device, wherein the subset of navigational display items are determined in response to an operational mode of the marine vessel;
   outputting the subset of navigational display items to the WIAR device;
   changing the operational mode and displaying a new subset of navigational display items;
   analyzing one of local knowledge, transit knowledge or ship handling knowledge; and
   displaying an associated knowledge display item to the WIAR device.

14. The method of claim 13, wherein the operational mode is determined based on:
   a set of predefined geozones; and
   a current GPS location.

15. The method of claim 13, wherein the WIAR device comprises WIAR glasses.

16. The method of claim 13, wherein the navigational display items include: RPM (revolutions per minute), COG (vessel path), SOG (speed), HDG (direction), BRG (direction of an object), CPA/TCPA (closest point of approach/time to the CPA), ROT (rate of turning) and WP (waypoint).

17. The method of claim 13, further comprising determining and outputting a recommended action to the WIAR device from a machine learning system.

* * * * *